(12) United States Patent
Urbach et al.

(10) Patent No.: US 11,161,557 B2
(45) Date of Patent: Nov. 2, 2021

(54) WHEEL SPOILER HAVING A PHYSICALLY COMPACT OVERLOAD COUPLING

(71) Applicant: Röchling Automotive SE & Co. KG, Mannheim (DE)

(72) Inventors: Patrick Urbach, Mainz (DE); Peter Dill, Ingolstadt (DE); Karsten Grebel, Bürstadt (DE); Andreas Cierpka, Worms (DE)

(73) Assignee: Röchling Automotive SE & Co. KG, Mannheim (DE)

( * ) Notice: Subject to any disclaimer, the term of this patent is extended or adjusted under 35 U.S.C. 154(b) by 96 days.

(21) Appl. No.: 16/705,803

(22) Filed: Dec. 6, 2019

(65) Prior Publication Data

US 2020/0189668 A1 Jun. 18, 2020

(30) Foreign Application Priority Data

Dec. 14, 2018 (DE) ..................... 10 2018 132 356.5

(51) Int. Cl.
*B62D 35/00* (2006.01)
*F15D 1/00* (2006.01)
*B62D 37/02* (2006.01)

(52) U.S. Cl.
CPC ........... *B62D 35/005* (2013.01); *B62D 37/02* (2013.01); *F15D 1/0005* (2013.01)

(58) Field of Classification Search
CPC ...... B62D 35/00; B62D 35/005; B62D 35/02; B62D 37/02
USPC ............................................ 296/180.1, 180.3
See application file for complete search history.

(56) References Cited

U.S. PATENT DOCUMENTS

| 10,232,895 | B2 | 3/2019 | Grebel |
| 10,377,428 | B2 | 8/2019 | Povinelli et al. |
| 10,625,792 | B2 * | 4/2020 | Shiga .................... B62D 35/005 |
| 2009/0295190 | A1 * | 12/2009 | Kottenstette ......... B62D 35/005 |
| | | | 296/180.3 |
| 2011/0049913 | A1 * | 3/2011 | Bernt ...................... B60R 19/48 |
| | | | 293/102 |
| 2017/0080770 | A1 * | 3/2017 | Irwin .................... B62D 35/005 |
| 2017/0120968 | A1 * | 5/2017 | Povinelli ................ B62D 35/02 |

(Continued)

OTHER PUBLICATIONS

German Search Report for corresponding DE 10 2018 132 356.5 dated Oct. 9, 2019, 8 pgs.

*Primary Examiner* — Jason S Daniels
(74) *Attorney, Agent, or Firm* — Rankin, Hill & Clark LLP

(57) ABSTRACT

A wheel spoiler arrangement, encompassing: a wheel spoiler carrier; a wheel spoiler received displaceably relative to the wheel spoiler carrier between inactive and active positions constituting operating positions; a motion guidance system between the carrier and the spoiler, a drive system to drive the spoiler between its operating positions, and an overload coupling that transfers force in a direction from the spoiler to the drive system up to a predetermined limit load; the overload coupling having a shiftable structure that is shiftable, between an effective position into which the structure is preloaded in a force-transferring engagement and a passive position in which position the force-transferring engagement is not possible; the shiftable structure being shiftable from the effective position into the passive position upon exceedance of the limit load resulting from a force acting on the spoiler.

19 Claims, 7 Drawing Sheets

(56) References Cited

U.S. PATENT DOCUMENTS

2018/0134329 A1\* 5/2018 Cha .................... B62D 35/007
2018/0298953 A1 10/2018 Andre et al.

\* cited by examiner

WHEEL SPOILER HAVING A PHYSICALLY COMPACT OVERLOAD COUPLING

This Application claims priority in German Patent Application DE 10 2018 132 356.5 filed on Dec. 14, 2018, which is incorporated by reference herein.

The present invention relates to a wheel spoiler arrangement, encompassing: a wheel spoiler carrier; a wheel spoiler received displaceably relative to the wheel spoiler carrier between an inactive position and an active position constituting operating positions; a motion guidance system which is arranged between the wheel spoiler carrier and the wheel spoiler and guides the displacement of the wheel spoiler between its operating positions; and a displacement drive system which is coupled motion-transferringly to the wheel spoiler and is embodied and arranged to drive the wheel spoiler relative to the wheel spoiler carrier to perform a displacement motion between its operating positions; there being arranged in the force transfer path between the displacement drive system and the wheel spoiler an overload coupling that transfers force in a direction from the wheel spoiler to the displacement drive system only up to a predetermined limit load; the overload coupling comprising a first coupling component permanently connected to the displacement drive system and a second coupling component permanently connected to the wheel spoiler; the first coupling component comprising an active configuration that forms, with a counterpart active configuration of the second coupling component, an active engagement pairing with which force is transferable from the displacement drive system to the wheel spoiler during a displacement of the wheel spoiler as intended from the inactive position into the active position; and the first coupling component comprising an inactive configuration that forms, with a counterpart inactive configuration of the second coupling component, an inactive engagement pairing with which force is transferable from the displacement drive system to the wheel spoiler during a displacement of the wheel spoiler as intended from the active position into the inactive position.

BACKGROUND OF THE INVENTION

Wheel spoilers of this kind are well known in automotive engineering. Wheel spoilers serve to reduce the air resistance of a vehicle in the region in front of its front wheels.

The following applies to the existing art and likewise to the present invention:

The wheel spoiler extends in the front end region of a motor vehicle over much of the vehicle's width, in the region of the underside of the vehicle body. At low vehicle speeds, for example when driving in built-up areas, the wheel spoiler is located in the inactive position that projects less into the air flow that impinges upon the motor vehicle when traveling forward. This serves to protect the wheel spoiler from undesired collisions, since in city driving objects are present on roadways more frequently than on main highways, and the vehicle furthermore travels more often over obstacles such as speed bumps or curbs, for which maximum ground clearance is advantageous.

At driving speeds at which no obstacles are to be expected, for example at driving speeds above 70 or 80 km/h, the wheel spoiler is driven by the displacement drive system, and guided by the motion guidance system, to move into an active position that projects farther into the air flow impinging upon the vehicle.

In the active position the wheel spoiler is located closer to the roadway being traveled on by the vehicle than in the inactive position, so that the vehicle has more ground clearance with the wheel spoiler in the inactive position than with the wheel spoiler in the active position. The risk of a collision between the wheel spoiler and an object lying on the roadway, or with a bump or road configuration, is therefore greater in the active position than in the inactive position.

The motion guidance system in fact serves only that purpose on the wheel spoiler arrangement, i.e. it permits a guided motion of the wheel spoiler between its operating positions (active position and inactive position). The motion of the wheel spoiler between the aforesaid operating positions is brought about exclusively by the displacement drive system.

If the wheel spoiler arrangement is imagined hypothetically without the displacement drive system and without the coupling member, an object that is located on the roadway and collides with the wheel spoiler arranged in the active position would simply displace the wheel spoiler in a direction toward the inactive position, so that in principle the wheel spoiler can evade the incoming object utilizing the impact load.

The displacement drive system that is in fact present, however, at first counteracts any such evading displacement of the wheel spoiler out of the active position toward the inactive position. The overload coupling prevents any evading displacement of the wheel spoiler until the limit load is reached, and permits it when that load is exceeded, since the first and the second coupling component are then movable relative to one another. This relative mobility allows the evading displacement.

Instead of the term "wheel spoiler," the term "front spoiler" or "air dam" is also used in the relevant technical sector for the apparatus being discussed here.

DE 10 2016 210 407 A1 discloses a front spoiler of the species which is protected from overload in the event of a collision. The known front spoiler is displaceable between its operating positions by way of an electric-motor drive system having a rotating output shaft, by means of a toggle linkage crank drive. An overload coupling is constituted by a drive-system-distal toggle linkage lever that is embodied as a latching fork and is in overridable latching engagement with a spoiler-side peg.

The known front spoiler can be displaced between its operating positions by the forces that are overridable via the latching engagement. But when a collision force that is predetermined in terms of design by the configuration of the latching engagement acts on the front spoiler, the latching engagement is overridden in order to avoid force feedback into the drive system, in which context the peg enters a space between the fork jaws of the latching fork. The latching engagement can be reestablished after a collision by operating the displacement drive system.

Although this approach functions well in principle, the triggering forces for overriding the latching engagement are limited, since the latching engagement is released and reestablished by deformation of the latching fork against its material elasticity. The deformation of the latching fork always creates a risk of damage thereto.

A further wheel spoiler having overload protection is known from WO 2015/191711 A2. A rotary electric-motor drive system comprises an overload coupling (not further characterized). According to an embodiment of WO 2015/191711 A2, an undesired collision of the wheel spoiler with an object is detected by a current spike in the drive system or in the drive system current, whereupon an uncoupling of the overload coupling is enabled.

This approach is disadvantageous in that the overload coupling is obviously enabled to uncouple via an actuator, which occasionally can require too long a time before the wheel spoiler is actually mechanically decoupled from the drive system. Until that time, the collision forces feed back into the drive system and can damage it.

SUMMARY OF THE INVENTION

An object of the present invention is to refine the wheel spoiler arrangement recited initially in such a way that, with the wheel spoiler in the active position, it can functionally withstand a collision with an object located on a roadway, the intention being not only that a decoupling of the wheel spoiler from the displacement drive system is to occur very quickly, but also that the limit load to be exceeded for that purpose is to be adjustable over a wide range. The functionality of the wheel spoiler arrangement after a collision that decouples the wheel spoiler from the displacement drive system is also intended to be capable of being reestablished using simple means.

The present invention achieves this object by way of a wheel spoiler arrangement of the kind recited initially in which, in at least one engagement pairing from among the active engagement pairing and inactive engagement pairing, one structure from among a configuration and a counterpart configuration of the engagement pairing is shiftable on a component body of the coupling component comprising the structure, relative to the component body, between an effective position projecting farther out of the component body, into which position the structure is preloaded and in which a force-transferring engagement with the respective other structure of the respective other coupling component is possible, and a passive position retracted farther into the component body, in which position the force-transferring engagement is not possible; the shiftable structure being shiftable, by the respective other structure of the same engagement pairing, from the effective position into the passive position upon exceedance of the limit load resulting from a force acting on the wheel spoiler, accompanied by termination of the force-transferring engagement of the structures with one another.

As a result of the shiftability of the structure relative to the coupling component body that carries it, a deformation of the coupling component or of a coupling component portion in order to decouple the displacement drive system and wheel spoiler in the event of a collision is not necessary. Decoupling can be accomplished solely by displacement of the structure made up of a configuration and counterpart configuration.

Because the structure shiftable between its effective position and its passive position is preloaded into the effective position, it will automatically return to the effective position upon cessation of an external load that exceeds its preload. It is then ready for another force-transferring engagement with the respective other structure of the same engagement configuration.

By adjustment of the preload with which the shiftable structure is preloaded into its effective position, or against which the shiftable structure is shiftable out of its effective position for decoupling the wheel spoiler and displacement drive system into the passive position, it is possible to adjust over a wide range the limit load at which a force-transferring engagement between a configuration and counterpart configuration of the relevant engagement pairing is terminated or cancelled, and the wheel spoiler is thereby mechanically decoupled from the displacement drive system.

Theoretically, any physical principle can be used to transfer drive force from the drive-side configuration to the spoiler-side counterpart configuration of an engagement pairing. In the case of a displacement of the wheel spoiler into the active position, this is a transfer of force from the active configuration to the counterpart active configuration of the active engagement pairing. For the opposite displacement into the inactive position, this is a transfer of drive force from the inactive configuration to the counterpart inactive configuration of the inactive engagement pairing. In order to transfer a force of the greatest possible magnitude between the structures (configuration and counterpart configuration) of an engagement configuration, the force-transferring engagement of the structures of the active and inactive engagement pairings is preferably in each case a physical abutting engagement with abutment surfaces that are non-parallel to the force transfer direction. In principle, the abutment surfaces can be arranged and configured to be flat and orthogonal to the force transfer direction. The shifting of a structure from the effective position into its passive position by the respective other structure of the same engagement pairing upon exceedance of the limit load can, however, be assisted by the fact that at least one, preferably both abutment surfaces of the configuration and counterpart configuration of the relevant engagement pairing is/are tilted relative to the force transfer direction. The tilt angle of the at least one abutment surface relative to the force transfer direction or relative to a reference plane orthogonal to the intended force transfer direction can also serve to adjust the limit load of the overload coupling at which the wheel spoiler becomes mechanically disconnected from the displacement drive system.

The wheel spoiler arrangement is preferably backlash-free. This means that the wheel spoiler exhibits no backlash at least in its active position, preferably also not in the inactive position. Undesired noise and mechanical loads are thereby avoided. Freedom from backlash for the wheel spoiler arrangement and the wheel spoiler can easily be ensured in the overload coupling by the fact that the respective abutment surfaces of both the active and the inactive engagement pairing are simultaneously in abutting engagement upon displacement operation of the wheel spoiler as intended. This means that the abutment surfaces of the inactive configuration and of the counterpart inactive configuration are in mutual abutting engagement even when, in the displacement instance, drive force is being transferred in only one direction, or when, with the wheel spoiler stationary, no drive force is being transferred from the displacement drive system to the wheel spoiler.

It is conceivable in principle for both the active engagement pairing and the inactive engagement pairing to comprise a structure, from among a configuration and a counterpart configuration, that is shiftable between an effective position and a passive position. The force transferable by the displacement drive system to the wheel spoiler is then limited in both opposing drive directions by the overload coupling; the limit load can be set differently in direction-dependent fashion by way of a corresponding different embodiment of the preload into the effective position and/or by way of different tilts of the abutment surfaces of the structures of the relevant engagement configurations relative to the intended force transfer direction or to a reference plane orthogonal to the intended force transfer direction.

But because, as a rule, the position of the displacement drive system when the wheel spoiler is in the more greatly collision-susceptible active position is known, it is usually sufficient if only one engagement pairing from among the active and inactive engagement pairing comprises a structure shiftable between an effective position and a passive position. The structures of the respective other engagement pairing can be arranged rigidly on their respective coupling components, preferably integrally therewith for reasons of strength. A maximum drive force deliverable by the displacement drive system can then be transferred to the wheel spoiler in one drive direction. It has been found in this context that, particularly advantageously, the structure shiftable between an effective position and a passive position is a structure of the inactive engagement pairing.

Although the shiftable structure can be arranged either on the first coupling component or on the second coupling component, the structure shiftable between an effective position and a passive position is preferably either the active configuration or the inactive configuration of the first coupling component. The first coupling component is permanently coupled to the displacement drive system, thereby ensuring that the force proceeding from the displacement drive system is always transferable to the shiftable structure. In light of the above consideration, the structure that is shiftable between an effective position and a passive position is particularly preferably the inactive configuration of the first coupling component.

The term "force" in the present Application is to be understood in principle as a higher-order term both for a force acting translationally and for a force acting rotationally in the sense of a torque. The overload coupling can accordingly be a translationally acting coupling in which either the first and the second coupling component are moved together translationally along a physically predetermined trajectory or, upon exceedance of the limit load, only one of the two coupling components is moved. Because of the substantially smaller installation space needed for the overload coupling, however, it is preferred if the overload coupling is a torque-transferring rotational coupling rotatable around a coupling axis.

In principle, the first and the second coupling component can be arranged successively to one another along the coupling axis, i.e. in an axial direction. In accordance with an embodiment that is advantageous because it requires little installation space, however, it is preferred if the first and the second coupling component axially overlap along the coupling axis in an overlap region, and if the one coupling component radially externally surrounds the respective other coupling component in the overlap region.

In principle, the first and the second coupling component can be arranged with an axial offset, if that is required by the physical space available for installing the wheel spoiler arrangement. In the interest of a maximally uniform transfer of drive force from the displacement drive system to the wheel spoiler, however, a coaxial arrangement of the first and the second coupling component, having the coupling axis as a common axis, is preferred. Once again, the radially inner and/or radially outer coupling component can be the coupling component relative to whose component body the structure, from among a configuration and a counterpart configuration, associated with the respective coupling component is shiftable. A radially outward shift between an effective position and a passive position can require more physical space for installation of the overload coupling than a radially inward shift, since the installation space radially inside the overload coupling is in any case already occupied by the latter. It is therefore preferred, in order to prevent the shiftable structure from projecting, in the passive position, radially outward beyond the radially outer coupling component, or to prevent the radially outer coupling component from having to be embodied with a particularly large radial dimension for reception of the shiftable structure in the passive position, if the coupling component having the structure shiftable between an effective position and a passive position is the radially inner coupling component.

In principle, it is sufficient to provide only one active engagement pairing and only one inactive engagement pairing on the overload coupling. To avoid eccentric force applications onto the rotational overload coupling, however, it is preferred if the overload coupling comprises a plurality of active engagement pairings and/or a plurality of inactive engagement pairings. In the interest of a symmetrical force application, active engagement pairings and inactive engagement pairings are preferably provided in equal numbers on the overload coupling. When at least a plurality of engagement pairings of the same type from among an active and inactive pairing are furnished, it is advantageous, in order to ensure the longest possible relative motion travel between a first and a second coupling part, if active engagement pairings and inactive engagement pairings are arranged alternatingly in a circumferential direction around the coupling axis. This includes the case in which, for example when two active engagement pairings and only one inactive engagement pairing are provided, the inactive engagement pairing is located between the two active engagement pairings. A corresponding situation exists in the inverse case, in which two inactive engagement pairings and only one active engagement pairing are provided.

An embodiment that is particularly advantageous, in terms of symmetrical force transfer or symmetrical force actions and a high level of motion functionality, can be achieved by the fact that the overload coupling comprises an even plurality of inactive engagement pairings each having a structure that is arranged on the radially inner coupling component and is shiftable between an active and a passive position; the shiftable structures being diametrically opposite one another pairwise and being shiftable along a common shifting axis. Preferably, exactly two shiftable structures are provided.

The reason is that the diametrically opposed placement of two shiftable structures makes it possible for the two diametrically oppositely located shiftable structures to guide their shifting motion from the effective position into the passive position and back, or at least to assist motion guidance thereof. Jamming of a shiftable structure, for example due to canting during its shifting motion, can thereby be counteracted. Provision can be made for this purpose that the one shiftable structure comprises a guidance configuration that is in guiding engagement with a counterpart guidance configuration of the respective other shiftable structure at least in order to assist guidance of the shifting motion.

It is intended to be sufficient if the guidance configuration and the counterpart guidance configuration make a contribution to guidance of the shifting motion. For example, the guidance configuration and the counterpart guidance configuration can engage into one another in telescoping fashion, for example so that the guidance configuration comprises a larger-diameter tube into which a smaller-diameter tube or a smaller-diameter peg of the counterpart guidance configuration penetrates, and so that they are movable in telescoping fashion relative to one another along the (now common) guidance axis of that coaxial telescope arrangement, accompanied by a change in penetration depth.

In addition to improved guidance of the shifting motion of the shiftable structures that are located diametrically opposite one another, the diametrical opposition of the shiftable structures also makes possible the use of a common preload device with which the two shiftable structures are preloaded into their respective effective positions. For example, a preload device can be arranged between two shiftable structures and can bias them in a direction away from one another. In a preferred embodiment, the preload device is a preload spring, for example a compression spring, e.g. in the space-saving form of a helical spring, which extends diametrically between the mutually oppositely located structures and comprises with its longitudinal ends a respective spring counterbrace in each structure.

In order to facilitate re-establishment of a functional overload coupling and a functional wheel spoiler arrangement after a collision-induced mechanical decoupling of the wheel spoiler and displacement drive system, the overload coupling can comprise a biasing device that biases the two coupling components in the direction of establishing a force-transferring engagement of the structures of an engagement pairing, preferably the active engagement pairing.

After a decoupling of the displacement drive system from the wheel spoiler due to termination of the force-transferring engagement between the configuration and counterpart configuration of at least one engagement pairing, abutting engagement between the structures of the engagement pairing, preferably of both engagement pairings, can be established by a motion of the displacement drive system. The more strongly the biasing device biases the coupling components in a direction toward one another, the less torque the displacement drive system needs to exert in order to re-establish a force-transferring engagement in an engagement pairing. When the shiftable structure is part of the inactive engagement pairing, as described above, the biasing device preferably biases the two coupling components in the direction of establishing a force-transferring engagement in the active engagement pairing. In this case the biasing force of the biasing device does not affect the limit load.

A precondition for a structure, once it has been shifted into its passive position, to remain in that passive position until the displacement drive system brings the overload coupling back into a state that is functional for displacement of the wheel spoiler, can be achieved by the fact that at a predefined radial distance from the coupling axis, and in a circumferential direction around the coupling axis, preferably in a circumferential direction that corresponds to the rotation direction of the first coupling component upon displacement of the wheel spoiler from the inactive position into the active position, the circumferential distance between an abutment surface of an active configuration and an abutment surface of a shiftable counterpart configuration that immediately follows in the circumferential direction, when considering the inactive configuration in its effective position, is greater than the inside width between the shiftable inactive configuration and a further active configuration immediately following it in the circumferential direction.

Depending on the selection of the radius at which the circumferential distance and the inside width are to be measured (in which context the same radius is to be utilized for determining both the circumferential distance and the inside width), the circumferential distance between the abutment surfaces of an active configuration and of a shiftable inactive configuration that is closest in a circumferential direction can be between approximately 81° and 100°. For the inside width, the preferred angular distances are in a range from 70° to 80°.

The shiftable configuration can be held in its passive position if the coupling component that has a rigid active configuration and rigid counterpart inactive configuration is embodied in such a way that the counterpart active configuration and the counterpart inactive configuration that is closest in a circumferential direction are end-located flanks of a radial projection that extends radially toward the respective other coupling component and has a cam surface proceeding in a circumferential direction between the flanks. The cam surface is embodied to hold an inactive configuration, which has been shifted into the passive position, in the passive position during a relative motion between the first and the second coupling component.

Particularly large forces can be exerted on the wheel spoiler by the displacement drive system if the displacement drive system encompasses a toggle linkage crank drive. A toggle linkage crank drive of this kind encompasses a crank, drivable by an actuator (e.g. a rotary electric motor), on which is articulated a toggle linkage lever that is pivotable around a pivot axis parallel to the drive rotation axis of the actuator. The use of a structure of the inactive engagement configuration, preferably the inactive configuration itself, as the structure shiftable between an effective position and a passive position can be utilized advantageously when the wheel spoiler, upon a displacement as intended from its inactive position into the active position, is rotated beyond its active top dead center point with maximum extension of the toggle linkage crank drive.

Regardless of the configuration of the coupling member, the motion guidance system can be any motion guidance system. It can be a plain guide or a linear guide; the latter is usually too complex for a wheel spoiler, but a motion guidance system of that kind is nevertheless also to be encompassed by the present invention. The motion guidance system preferably encompasses a four-joint linkage. To avoid mechanical stress loads at the joints and in the arms of the four-joint linkage as well, a plurality of joints, particularly preferably all joints, are embodied as ball joints.

The present invention also relates to a motor vehicle having a wheel spoiler arrangement as described above, the wheel spoiler carrier being arranged in vehicle-body-mounted fashion.

Lastly, the present invention also relates to an overload coupling, having a first coupling component connectable to a drive system and having a second coupling component connectable to a component that is to be moved, as described and refined above.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DESCRIPTION OF PREFERRED EMBODIMENTS

Figure 1:
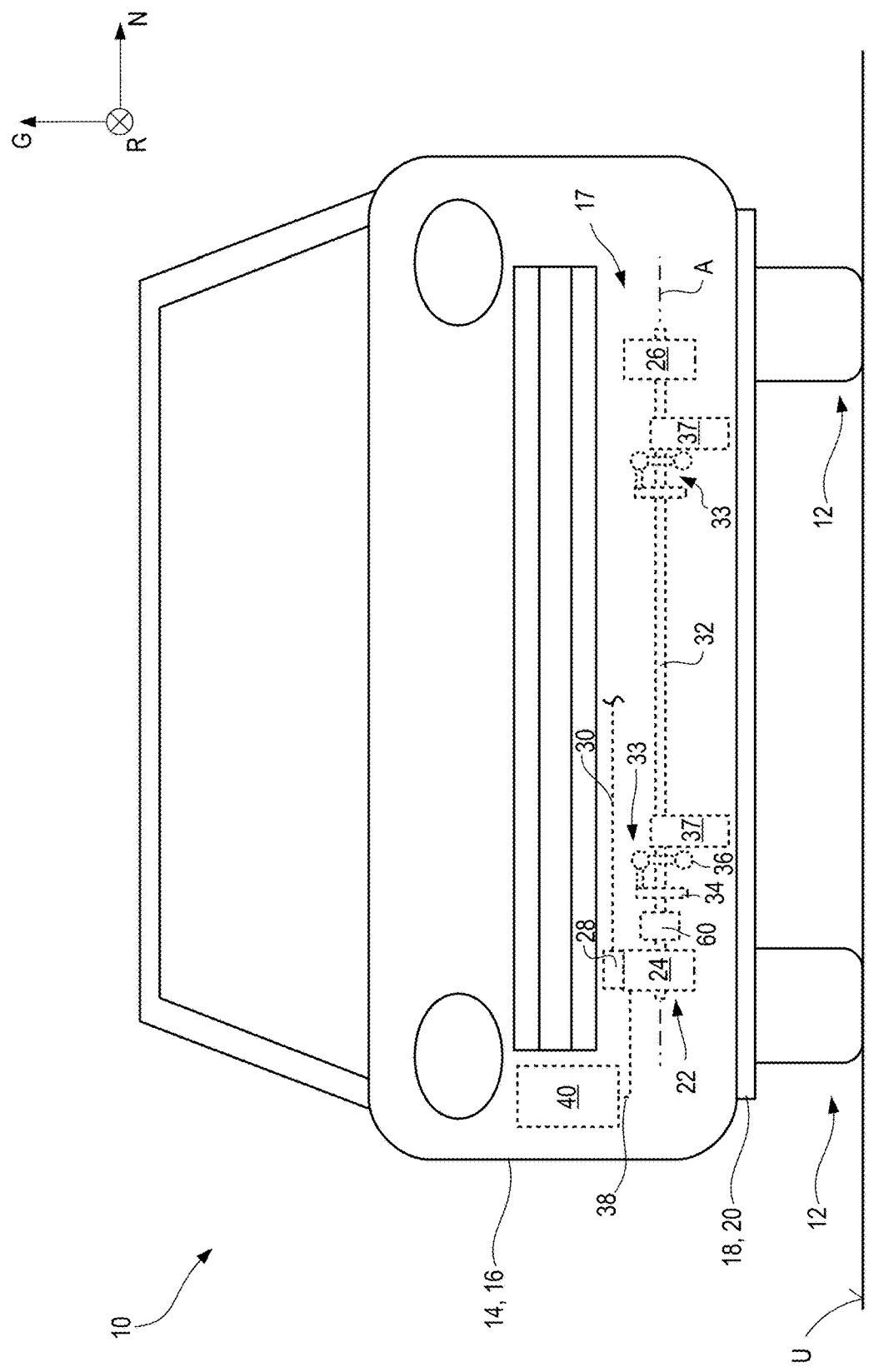
FIG. 1 is a schematic front view, looking along the roll axis of the motor vehicle, of a motor vehicle having a wheel spoiler arrangement according to the present invention, the wheel spoiler being in the inactive position.

Referring now to the drawings wherein the showings are for the purpose of illustrating preferred and alternative embodiments of the invention only and not for the purpose of limiting the same, in FIG. 1, an embodiment according to the present invention of a motor vehicle of the present Application is labeled in general with the number 10. Motor vehicle 10, depicted merely schematically, is viewed from the front, i.e. looking along roll axis R. Also extending along roll axis R is the flow impingement direction along which wind blast impinges upon vehicle 10 in the context of forward travel. Two front wheels 12 of motor vehicle 10 carry a vehicle body 14 above a substrate U on which motor vehicle 10 is rollably supported. Vehicle body 14 constitutes a first motor vehicle portion 16.

A wheel spoiler arrangement 17, having an active wheel spoiler 18 that constitutes a second motor vehicle portion 20 displaceable relative to vehicle body 14, is arranged in the front end region of motor vehicle 10 even farther forward than front wheels 12. In the exemplifying embodiment depicted, active wheel spoiler 18 is movable between its operating positions parallel to yaw axis G of motor vehicle 10. In a more greatly preferred embodiment, it is also movable between its operating positions parallel to roll axis R of motor vehicle 10. For better orientation, the axes of the Cartesian motor-vehicle coordinate system, comprising yaw axis G, pitch axis N, and roll axis R, are depicted in a coordinate-axis triangle. In FIG. 1, wheel spoiler 18 is in its inactive position.

In order to bring about the relative motion of active wheel spoiler 18 relative to vehicle body 14, motor vehicle 10 comprises a displacement drive system 22 encompassing, for example, an actuator 24 and a control apparatus 28 physically integrated into actuator 24. Arranged remotely from actuator 24 in a pitch-axis direction is a output drive shaft bearing 26 that supports output drive shaft 32 to rotate around its longitudinal output drive shaft axis A. Output drive shaft bearing 26 is not obligatorily necessary, but is recommended for longer output drive shafts 32.

Control apparatus 28, having one or several integrated circuits, also handles communication tasks and thus data communication between actuator 24 and the onboard electronic system of the remainder of motor vehicle 10. Control apparatus 28, and thus actuator 24, are connected for that purpose, via a data lead 30 that is merely indicated, to the onboard electronic system of the remainder of motor vehicle 10. Data lead 30 is preferably part of a data bus.

In the example depicted, actuator 24 in the form of a rotary electric motor drives a output drive shaft 32. Output drive shaft 32 passes through output drive shaft bearing 26, where output drive shaft 32 is supported again because of the long protrusion length as measured from actuator 24. Output drive shaft 32 extends along the aforementioned longitudinal output drive shaft axis A around which output drive shaft 32 also rotates during operation.

Output drive shaft 32 comprises two transfer arrangements 33 arranged at a distance from one another along output drive shaft 32, transfer arrangements 33 being of substantially identical construction. It is therefore sufficient to describe only one transfer arrangement 33, a description of which also applies to the respective other transfer arrangement 33.

Transfer arrangements 33 each comprise a crank 34 that constitutes a part of displacement drive system 22 and is connected for rotary motion together with output drive shaft 32 around longitudinal output drive shaft axis A. An output drive peg of crank 34, which peg is bent with reference to output drive shaft 32 and longitudinal output drive axis A, is articulatedly connected to a coupling member 36. Coupling member 36 is articulatedly connected, at its longitudinal end remote from the output drive peg, to wheel spoiler 18. At least one respective motion guidance system 37, one located closer to actuator 24 and one closer to output drive shaft bearing 26, guides wheel spoiler 18 to move between its operating positions. The actuator housing of actuator 24, and output drive shaft bearing 26, are supported on vehicle body 14.

For energy delivery, electrical actuator 24 is connected to vehicle battery 40, constituting an electrical energy source, via a supply lead 38 that feeds into actuator 24.

Actuator 24 is energy-transferringly connected to vehicle battery 38, such that as a function of data signals received by control apparatus 28 via data lead 30, control apparatus 28 of actuator 24 either does or does not cause actuator 24 to be energized, and thus to be switched from an inactive non-operational state into a force- and motion-outputting operating state.

An overload coupling 60 is arranged in the force transfer path between actuator 24 and transfer arrangements 33 in order to protect actuator 24 from the force feedback of an undesired collision of wheel spoiler 18 with an object located on substrate U that is being driven on. As a result of its physical conformation, overload coupling 60 transfers a load from wheel spoiler 18 to actuator 24 only up to a predetermined limit load, i.e. up to a predetermined limit torque in the case of output drive shaft 32. In the opposite direction, force transfer is limited in terms of design only by the ultimate strength of the overload coupling.

Figure 2:
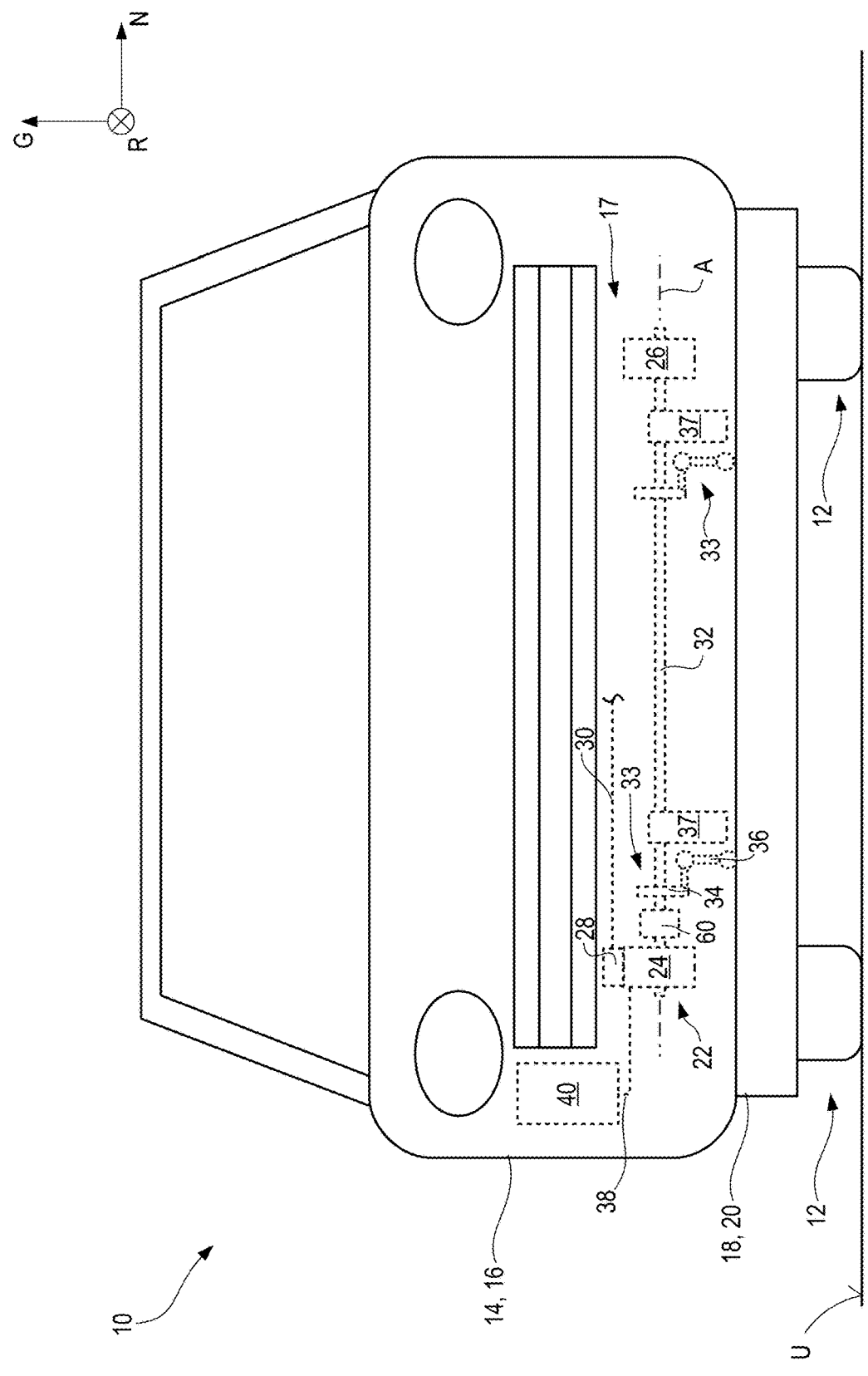
FIG. 2 is the view of the FIG. 1 with the wheel spoiler in the active position.

FIG. 2 shows motor vehicle 10 of FIG. 1 after a shifting of wheel spoiler 18 closer to substrate U, as occurs e.g. when motor vehicle 10 is traveling continuously at a speed that is typical of driving outside built-up areas on main highways or expressways, for example at more than 70 km/h.

Wheel spoiler 18 has been displaced parallel to yaw axis G in the course of the displacement from the inactive position into the active position. It has also preferably been displaced along roll axis R toward the viewer of FIG. 2.

Beyond simply switching the energy supply to actuator 24 on and off, control apparatus 28 of actuator 24 can also influence the magnitude of that energy supply over the duration of the operating state of actuator 24, for example in such a way that the motion of output drive shaft 32 comprises a startup ramp at a constant acceleration from a stop, a motion phase at a constant high speed, and a deceleration ramp at a constant acceleration to a stop.

Figure 3:
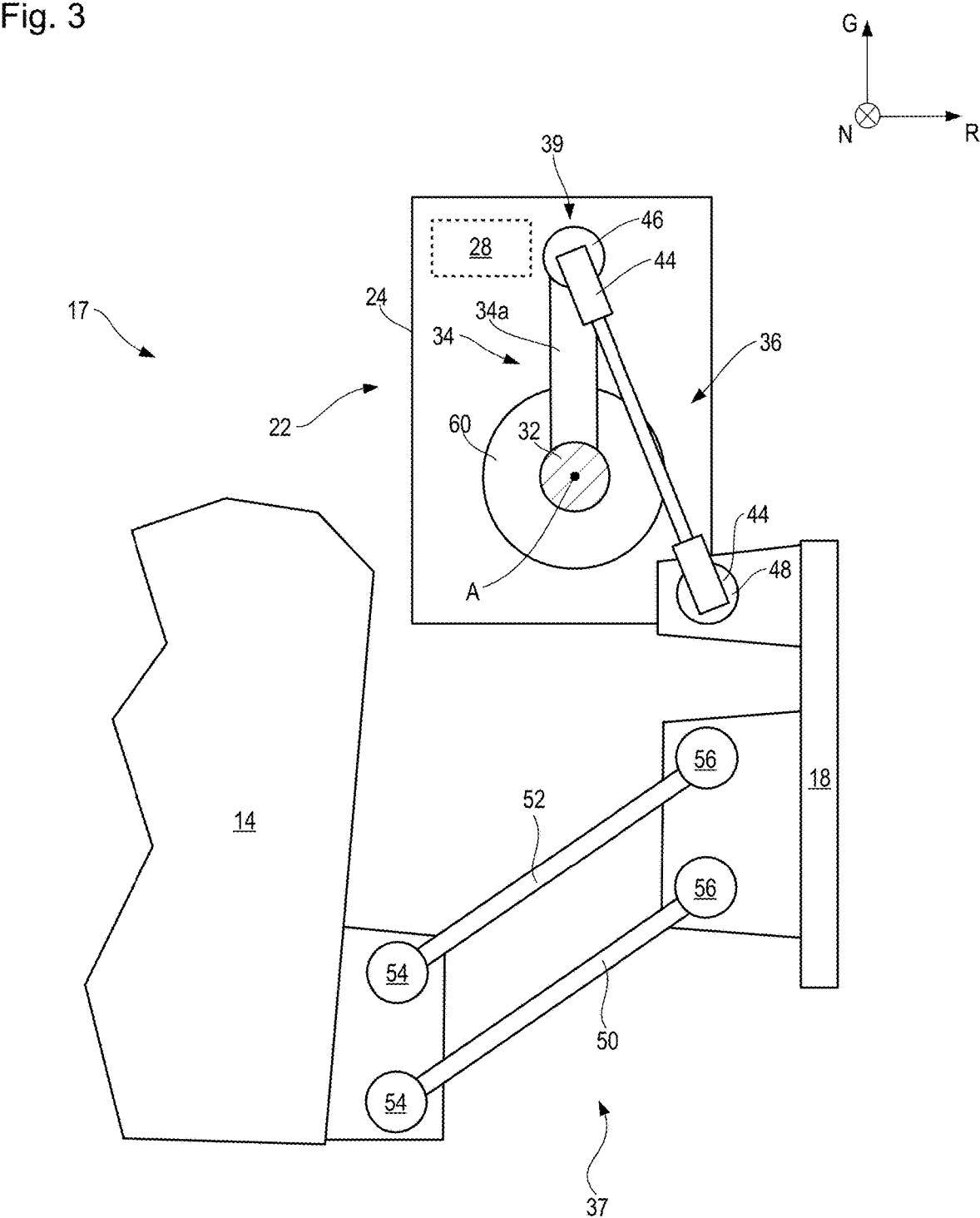
FIG. 3 is a schematic depiction, looking along the pitch axis of the motor vehicle or in a longitudinal direction of the wheel spoiler, of the wheel spoiler arrangement of FIGS. 1 and 2 with the wheel spoiler in the inactive position.

FIG. 3 is a schematic depiction of the functional relationships among actuator 34, motion guidance system 37, wheel spoiler 18, and vehicle body 14. Actuator 24 is fixedly connected to vehicle body 14.

Wheel spoiler 18 is in its inactive position in FIG. 3. Crank 34, which is rotatable around longitudinal output drive shaft axis A that is orthogonal to the drawing plane of FIG. 3, is in an operating position which is associated with the inactive position of wheel spoiler 18 and in which coupling member 36 is sharply angled with respect to crank arm 34a that protrudes from output drive shaft 32. Crank 34 or crank arm 34a, and coupling member 36, form a toggle linkage.

In this embodiment, coupling member 36 encompasses a respective coupling piece 44 at both of its longitudinal ends. Each coupling piece 44 is part of a ball joint. Ball joint 46 couples drive-system-proximal coupling piece 44 to crank 34. Ball joint 48 couples drive-system-distal coupling piece 44 to wheel spoiler 18.

The longitudinal axis of coupling member 36 proceeds parallel to the drawing plane of FIG. 3.

In the preferred exemplifying embodiment that is depicted, motion guidance system 37 is a four-joint linkage having two arms 50 and 52 which are articulated at their one longitudinal end on vehicle body 14 via ball joints 54, and are articulated at their oppositely located longitudinal ends, located closer to wheel spoiler 18, on wheel spoiler 18 by means of ball joints 56.

Figure 4:
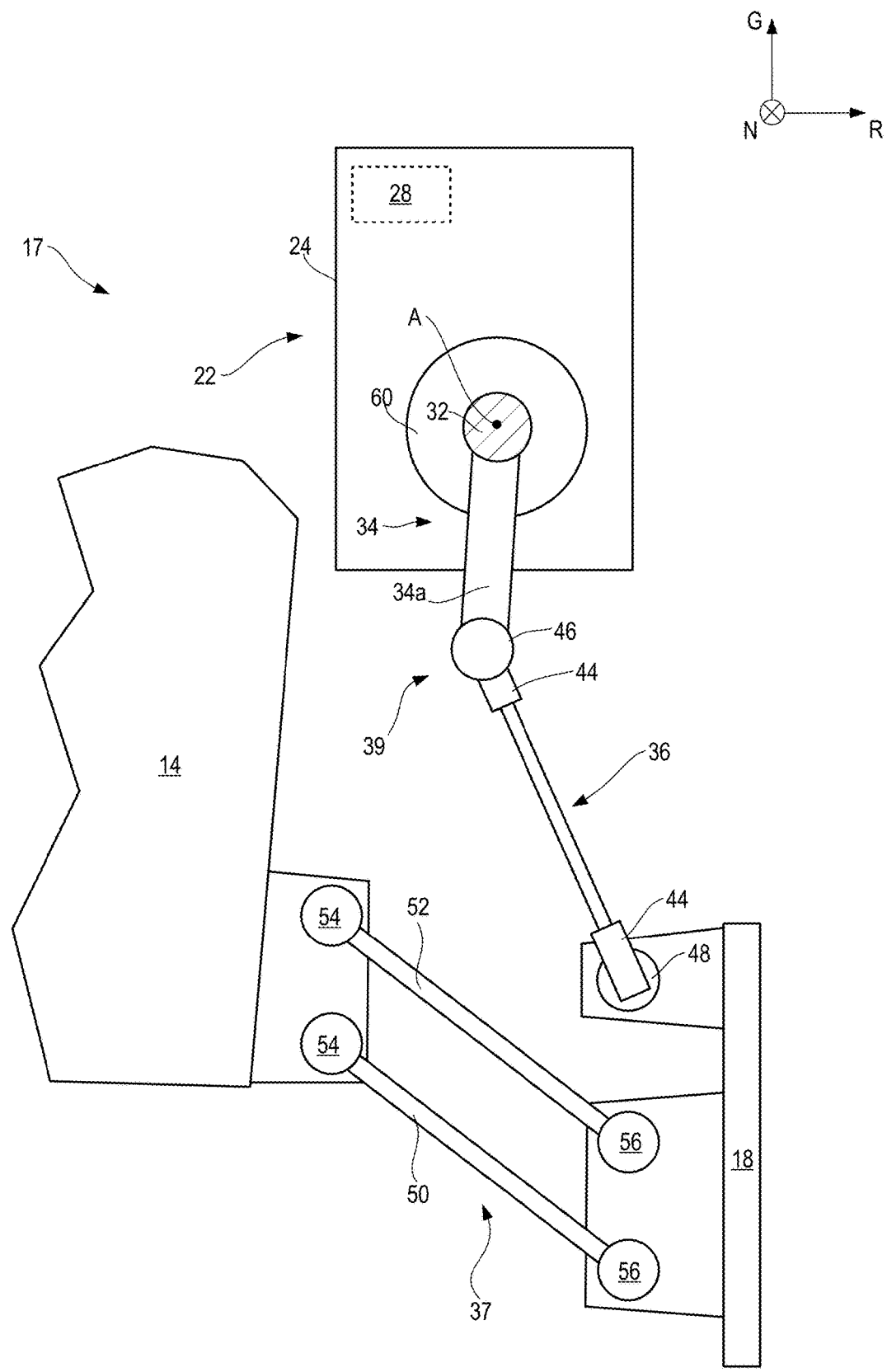
FIG. 4 is the view of FIG. 3 with the wheel spoiler in the active position.

For the sake of simplicity, the four-joint linkage of motion guidance system 37 is depicted in FIGS. 3 and 4 as a parallelogram arm linkage. In reality, however, the four-joint arm linkage will have a configuration that deviates from a parallelogram arm linkage, i.e. the four rotation axes of the four-joint linkage do not constitute the edges of a cuboid in any operating position, so that the motion path of the wheel spoiler between its operating positions has a component not only along yaw axis G but preferably also along roll axis R. The simplified depiction as a parallelogram arm linkage is nevertheless sufficient to explain the function of motion guidance system 37 in interaction with displacement drive system 22.

FIG. 4 depicts displacement drive system 22, wheel spoiler 18, and motion guidance system 37 after a displacement of crank 34 through somewhat more than half a revolution around longitudinal output drive shaft axis A. Wheel spoiler 18 is in its active position.

Upon the transition from the inactive position shown in FIG. 3 to the active position shown in FIG. 4, toggle linkage 39 becomes moved beyond its active dead center point, which is closer to wheel spoiler 18 and at which crank arm 34a and coupling member 36 are maximally extended. The effect of this is that a collision of wheel spoiler 18 with an object while driving, which collision has an effect that forces wheel spoiler 18 toward its inactive position, transfers to output drive shaft 32 a collision moment that acts in the same direction as the drive moment displacing wheel spoiler 18 from the inactive position into the active position, so that in the event of a collision between wheel spoiler 18 and an object, output drive shaft 32 can be rotated farther in the same direction in which it is being rotated upon a displacement of wheel spoiler 18 from the inactive position into the active position.

Figure 5:
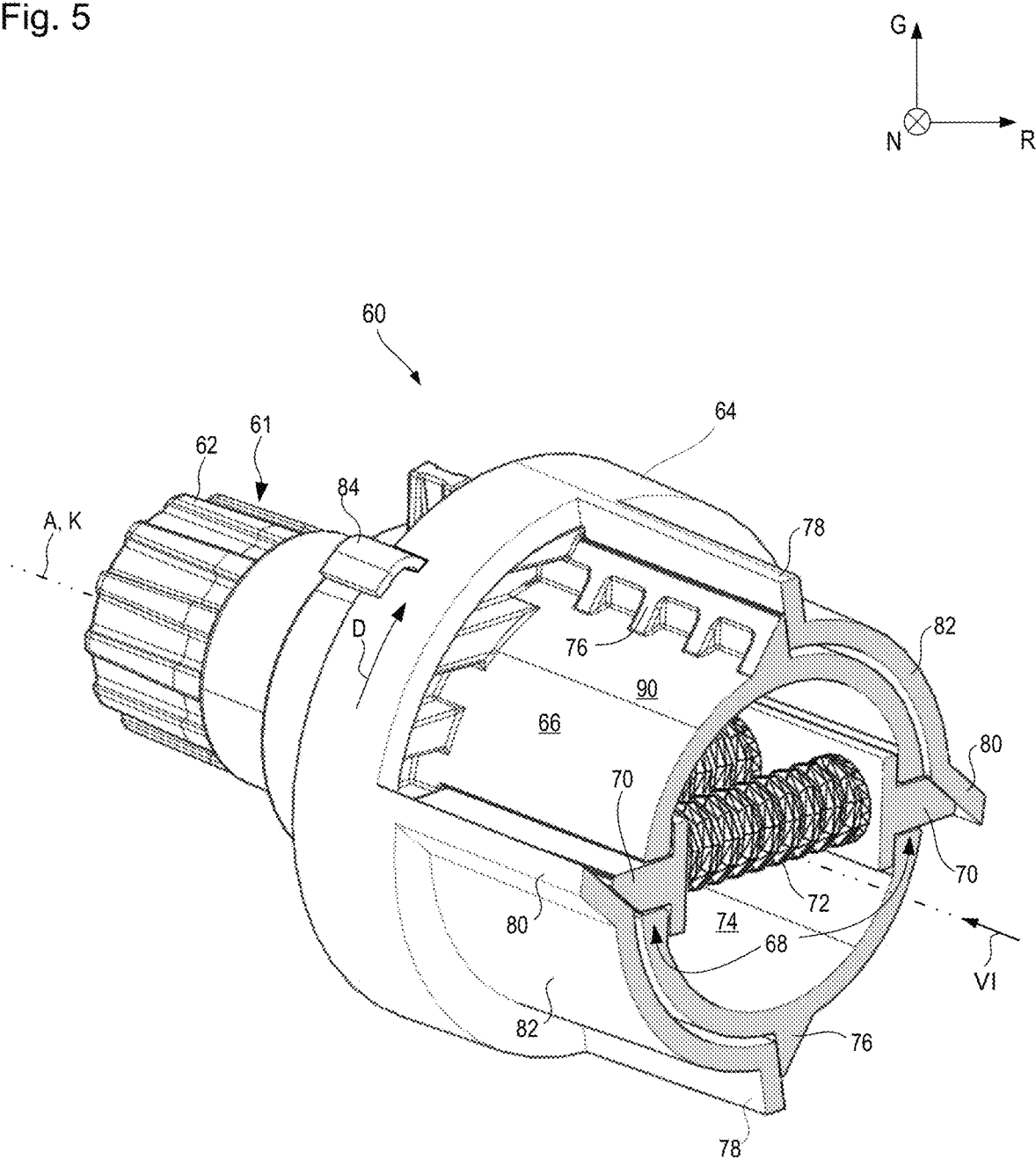
FIG. 5 is a perspective section view of an embodiment of the overload coupling of the wheel spoiler arrangement according to the present invention, the section plane being oriented orthogonally to the coupling axis.

The construction and manner of operation of overload coupling 60 will be explained below with reference to FIGS. 5 to 7.

Overload coupling 60 rotates around a coupling axis K that is coaxial with longitudinal output drive shaft axis A.

Overload coupling 60 encompasses a first, radially inner coupling component 62 that is connectable to actuator 24 in directly force- or torque-transferring fashion by a coupling extension 61.

Overload coupling 60 further encompasses a radially outer coupling component 64 that is arranged coaxially with first coupling component 62 with respect to coupling axis K.

Second coupling component 64 is directly connectable by means of a hub extension 65 to output drive shaft 32, and thereby to transfer arrangements 33, in order to transfer force or torque.

First coupling component 62 comprises a component body 66 that comprises, at two diametrically opposite circumferential points, openings 68 which pass through component body 66 and are passed through by pawls 70. In the example depicted, pawls 70 constitute inactive configurations of overload coupling 60. Pawls 70 are preloaded radially outward, against the preload force of helical compression springs 72, into their effective position shown in FIGS. 5 and 6.

Pawls 70 are shiftable toward one another into their respective passive position in a radial direction, i.e. orthogonally to coupling axis K, through openings 68, into a radially inner cavity 74 of first coupling component 62.

Radial projections 76, which are preferably shaped in one piece and which are active configurations for purposes of the present Application, are arranged on component body 66 once again approximately diametrically oppositely but at a distance from pawls 70.

Second coupling component 64 comprises flanges 78 that are in abutting engagement with radial projections 76. Flanges 78 are counterpart active configurations for purposes of the present Application.

For likewise physical abutment against pawls 70, second coupling component 64 comprises struts 80 that are in abutting engagement with pawls 70. Struts 80 are counterpart inactive configurations for purposes of the present Application.

Located between a flange 78 and a strut 80, in a circumferential direction that corresponds to rotational drive direction D for shifting wheel spoiler 18 into the active position, is a cam body 82 that extends in partly cylindrical fashion around coupling axis K.

Second coupling component 64 is biased by a helical spring 82 relative to first coupling component 62, oppositely to direction D, in such a way that it pushes flanges 78 into abutting engagement with radial projections 76.

The circumferential distance between a flange 78 and a strut 80 having a cam body 82 arranged between them is sufficiently large that both flange 78 and strut 80 are simultaneously in abutting engagement with the associated radial projection 76 or with the associated pawl 70. The two coupling components 62 and 64 are thus arranged with zero backlash in a circumferential direction around coupling axis K.

Figure 6:
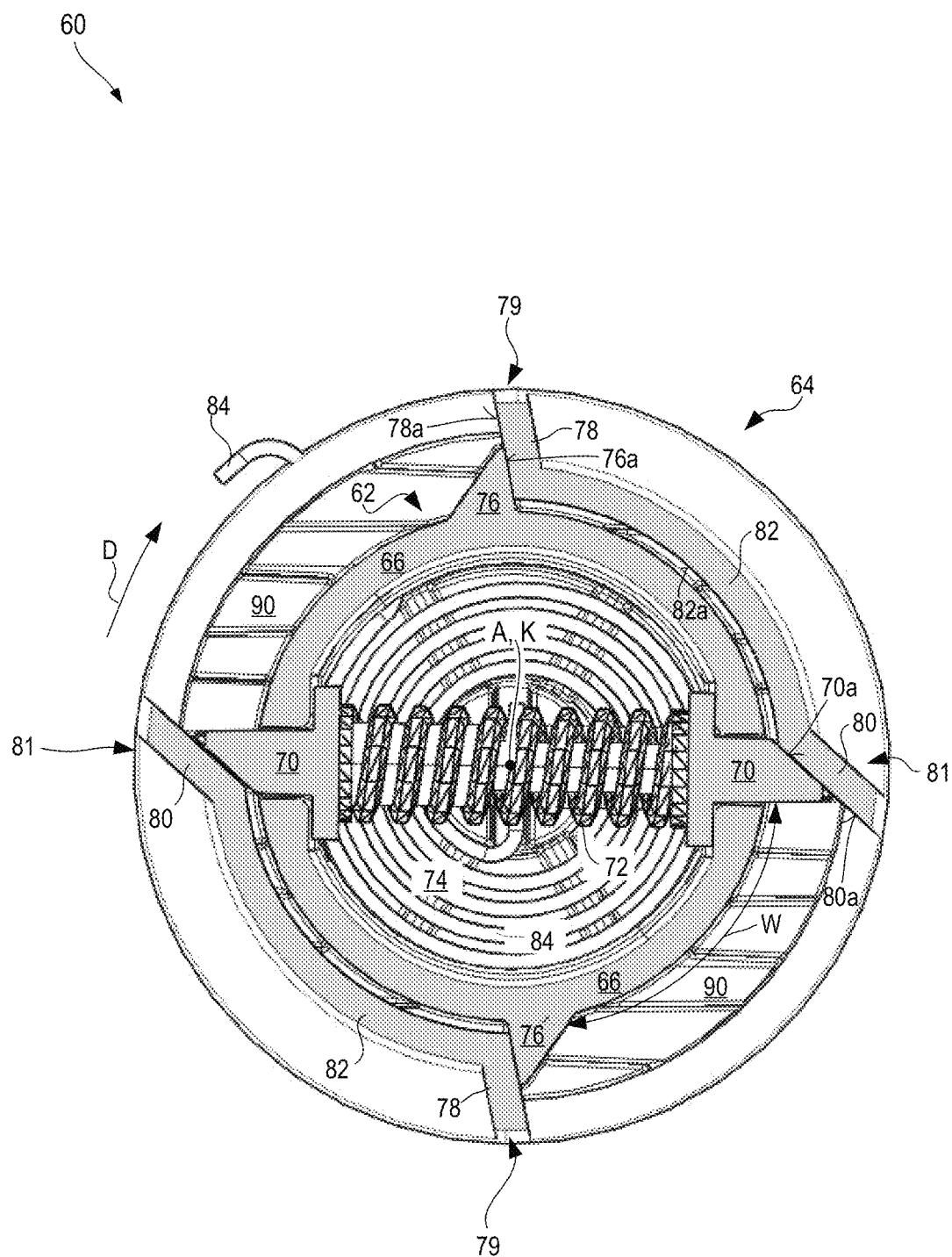
FIG. 6 is an axial section view of the overload coupling of FIG. 5 along the coupling, in the direction of arrow VI of FIG. 5.

FIG. 6 clearly shows the manner in which a (preferably flat) abutment surface 76a of radial projection or active configuration 76 is in liftable abutting engagement with a (preferably flat) counterpart abutment surface 78a of the flange or of counterpart active configuration 78. As a result of this abutting engagement, torque can be transferred only in a clockwise direction (when viewing FIG. 6) from first coupling component 62 to second coupling component 64.

A (preferably flat) abutment surface 70a of pawl 70 is likewise in abutting engagement, between pawl 70 and strut 80, against a (preferably flat) abutment surface 80a of strut 80.

Radial projection 76 and flange 78 constitute an active engagement pairing 79, and pawl 70 and strut 80 abutting against it constitute an inactive engagement pairing 81. In the interest of better clarity, the abutment surfaces are depicted in FIG. 6 only on the upper active engagement pairing 79 and on the right-hand inactive engagement pairing 81.

An arrangement group made up of radial projection 76 and a pawl 70 that is closest in drive direction D can be transformed, by a 180° rotation around coupling axis K, into the respective other radial projection 76 and the respective other pawl 70. Component body 66 of first coupling component 62 is in that regard constructed centrically symmetrically or at least locally centrally symmetrically, with coupling axis K as a centrical symmetry axis.

That portion of second coupling component 64 which comprises (preferably in one piece) flanges 78, struts 80, and cam bodies 82 is likewise constructed centrically symmetrically with respect to coupling axis K in the sense that the one arrangement made up of flange 78, strut 80, and cam body 82 can be transformed, by a 180° rotation around coupling axis K, into the respective other group made up of a flange, cam body, and strut.

Abutment surfaces 76a and 78a of active engagement pairing 79, and abutment surfaces 70a and 80a of inactive engagement pairing 81, are each tilted around coupling axis K with respect to a circumferential direction or with respect to a reference plane that is orthogonal to the circumferential direction and contains the coupling axis. The abutment surfaces of inactive engagement pairing 81 are more greatly tilted with respect to the aforesaid circumferential direction than are abutment surfaces 76a, 78a of active engagement pairing 79.

It is easy to recognize that the very slight tilt, relative to the aforesaid reference plane, which is exhibited by abutment surfaces 76a and 78a of active engagement pairings 79 brings about a very effective torque transfer from first coupling component 62 to second coupling component 64 in drive rotation direction D.

The greater tilt of abutment surfaces 70a and 80a of the inactive engagement pairings relative to the reference plane serves, together with the spring stiffness of preload springs 72, for adjustment of the limit load at which overload coupling 60 cannot transfer any further torque in a direction opposite to drive rotation direction D.

In conventional operation as intended, first coupling component 62 can also transfer a torque oppositely to drive rotation direction D, via pawls 70 and struts 80, to second coupling component 64 in order to displace wheel spoiler 18 from the active position back into the inactive position.

If wheel spoiler 18 in the active position collides with an object, however, so that the resulting collision forces act in the direction of a return of wheel spoiler 18 into the inactive position, this means that an abrupt torque in the direction of drive rotation direction D is transferred to second coupling component 64. This is the result of the top dead center position of toggle linkage 39 in the active position of wheel spoiler 18, as shown in FIG. 4. In the context of a view toward the second, radially outer coupling component 64 in FIG. 6, when a torque is abruptly exerted in the direction of drive rotation direction D, struts 80 then displace pawls 70, via the abutting engagement, radially inward against the preload force of preload springs 72, in which context second coupling component 64 rotates clockwise, i.e. in drive rotation direction D, relative to first coupling component 62.

When a radially inward-facing surface 82a of cam body 82 comes into engagement with the radially outer tip of pawl 70, cam body 82 holds pawl 70 in its passive position that it has then reached (not depicted).

Second coupling component 64 can then rotate in drive rotation direction D, relative to first coupling component 62, until the (now leading) abutment surface 80a of strut 80 comes into abutment against the back side of active configuration 86 (latching projection) that is closest in the drive rotation direction D.

The back sides of latching projections 76, i.e. the side facing away from abutment surface 76a, preferably exhibits the same tilt with respect to a circumferential direction, or with respect to the aforementioned reference plane containing the coupling axis, as abutment surfaces 70a of pawls 70, so that without a great deal of surface pressure, strut 80 can come into abutment against the back side of a latching projection 76 and its motion can be decelerated there. The above-described relative rotational motion of second coupling component 64 in the event of a collision, after pawls 70 are forced into their passive position, occurs against the biasing force of biasing spring 84, so that with an increasing relative rotation travel, a further relative rotation of second coupling component 64 relative to first coupling component 62 is counteracted by an increasingly large force.

Because latching projections 76 and pawls 70 are embodied asymmetrically in a circumferential direction, the distance between one abutment surface 76a and an abutment surface 70a following directly in a drive rotation direction D, for example at the radial height of the radially inner surface of cam body 82, is less than the inside width W, at the same radial height, between pawl 70 and latching projection 76 that follows directly in drive rotation direction D. This dimensional relationship ensures that after a relative rotation of second coupling component 64 relative to first coupling component 62, the pawl remains in the passive position, and is held there by cam body 82, even when strut 80 has rotated, beyond its original abutting position with a pawl 70, to the next latching projection 76 in drive rotation direction D.

The original engagement position, shown in FIG. 6, of the conventional operating mode can then be re-established by driving first coupling component 62 in drive direction D, since wheel spoiler 18 has already moved toward the inactive position because of the collision.

Alternatively, first coupling component 62 can also be rotated oppositely to drive rotation direction D, i.e. in the direction of a displacement of wheel spoiler 18 into the inactive position. When wheel spoiler 18, in the inactive position, abuts against an end stop (not depicted), that end stop will also hold second coupling component 64, coupled directly to wheel spoiler 18 for rotation together, in position, and will enable a relative rotation of the first coupling component relative to second coupling component 64.

As a result of their preload by preload springs 72, pawls 70 return automatically to their effective position shown in FIG. 6 as soon as they are no longer prevented from doing so by cam body 82.

Figure 7:
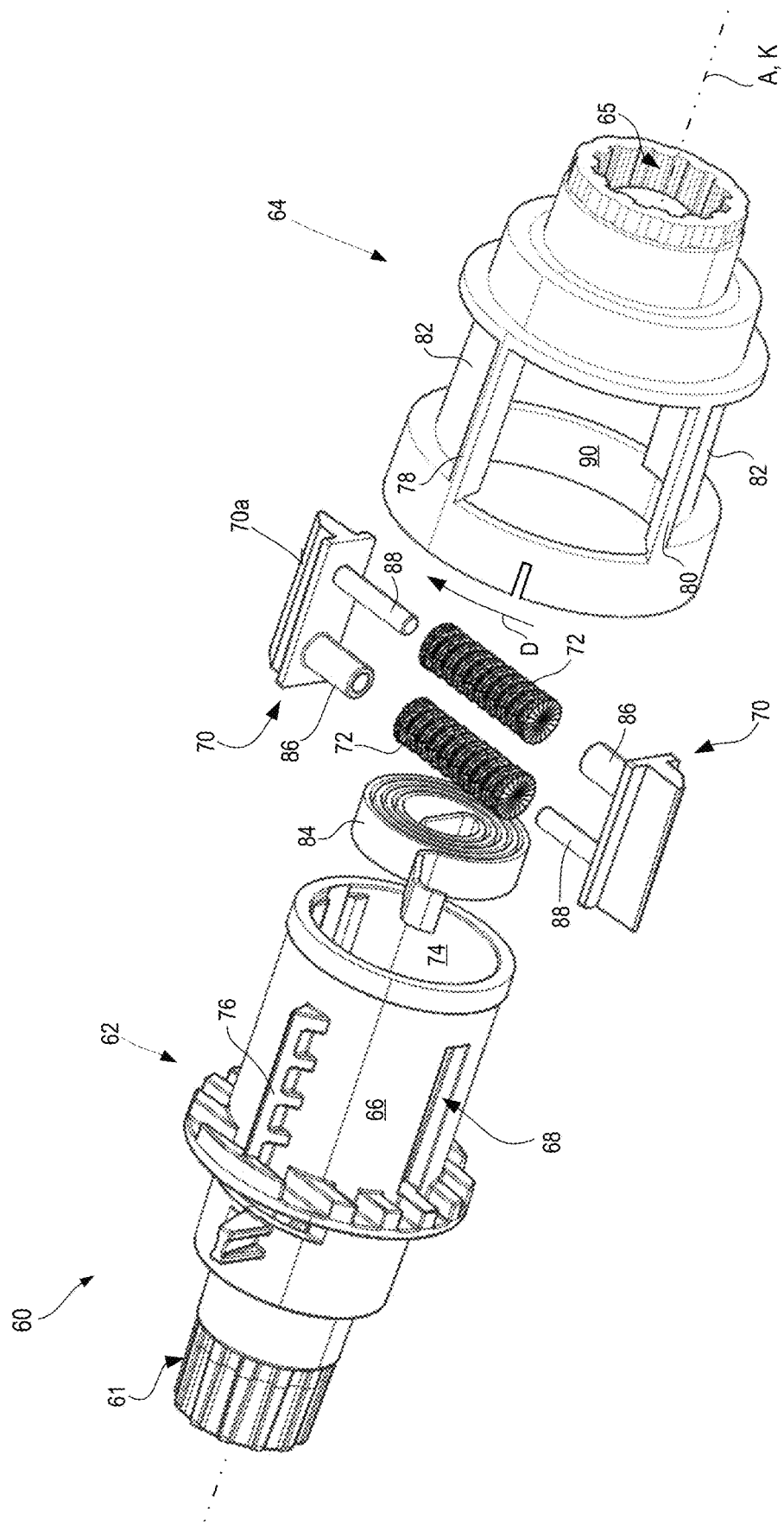
FIG. 7 is a perspective exploded view of the overload coupling of FIGS. 5 and 6.

It is apparent from the exploded depiction of FIG. 7 that pawls 70 each comprise, on their sides facing toward one another, a respective guidance configuration 86 and a counterpart guidance configuration 88.

Each guidance configuration 86 is embodied, by way of example, as a cylindrical tubular stub that protrudes from a pawl 70 into interior space 74 of first coupling component 62.

Each counterpart guidance configuration 88 is embodied, by way of example, as a cylindrical peg that likewise protrudes from pawl 70 radially inwardly into interior space 74 of first coupling component 62. The outside diameter of peg 88 therefore corresponds, with a clearance fit, to the inside diameter of the hollow-cylindrical tube 86. Pegs 88 are guided in telescoping fashion in tubular stubs 86, movably along the tube axis that they then share. Tubular stubs 86, and pegs 88 that interact with them, pass through helical compression springs 72 along their helical axis.

Guidance configurations 86 and counterpart guidance configurations 88 that have thus been described contribute, along with opening 68, to guiding the motion of pawls 70 between the effective position and passive position.

It is furthermore evident from FIG. 7, as it is from FIG. 6, that an opening 90 passing in a radial direction through coupling component 64 is located in a circumferential direction between two cam bodies 82.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A wheel spoiler arrangement, encompassing: a wheel spoiler carrier; a wheel spoiler received displaceably relative to the wheel spoiler carrier between an inactive position and an active position constituting operating positions; a motion guidance system which is arranged between the wheel spoiler carrier and the wheel spoiler and guides the displacement of the wheel spoiler between its operating positions; and a displacement drive system which is coupled motion-transferringly to the wheel spoiler and is embodied and arranged to drive the wheel spoiler relative to the wheel spoiler carrier to perform a displacement motion between its operating positions; there being arranged in a force transfer path between the displacement drive system and the wheel spoiler an overload coupling that transfers force in a direction from the wheel spoiler to the displacement drive system only up to a predetermined limit load; the overload coupling comprising a first coupling component permanently connected to the displacement drive system and a second coupling component permanently connected to the wheel spoiler; the first coupling component comprising an active configuration that forms, with a counterpart active configuration of the second coupling component, an active engagement pairing with which force is transferable from the displacement drive system to the wheel spoiler during a displacement of the wheel spoiler as intended from the inactive position into the active position; and the first coupling component comprising an inactive configuration that forms, with a counterpart inactive configuration of the second coupling component, an inactive engagement pairing with which force is transferable from the displacement drive system to the wheel spoiler during a displacement of the wheel spoiler as intended from the active position into the inactive position, wherein, in at least one engagement pairing from among the active engagement pairing and inactive engagement pairing, one structure from among a configuration and a counterpart configuration of the engagement pairing is shiftable on a component body of the coupling component comprising the structure, relative to the component body, between an effective position projecting farther out of the component body, into which position the structure is preloaded and in which a force-transferring engagement with the respective other structure of the respective other coupling component is possible, and a passive position retracted farther into the component body, in which position the force-transferring engagement is not possible; a shiftable structure being shiftable, by a respective other structure of the same engagement pairing, from the effective position into the passive position upon exceedance of a limit load resulting from a force acting on the wheel spoiler, accompanied by termination of the force-transferring engagement of the structures with one another, wherein the overload coupling is a torque-transferring rotational coupling rotatable around a coupling axis, the first and the second coupling component axially overlap along the coupling axis in an overlap region; and the one coupling component radially externally surrounds the respective other coupling component in the overlap region and the coupling component having a structure shiftable between the effective position and the passive position is a radially inner coupling component.

2. The wheel spoiler arrangement according to claim 1, wherein the force-transferring engagement of the structures of the active and inactive engagement pairings is in each case a physical abutting engagement with abutment surfaces that are non-parallel to the force transfer direction.

3. The wheel spoiler arrangement according to claim 1, wherein the respective abutment surfaces of both the active and the inactive engagement pairing, are simultaneously in abutting engagement upon displacement operation of the wheel spoiler as intended.

4. The wheel spoiler arrangement according to claim 1, wherein only one engagement pairing from among the active and the inactive engagement pairing comprises a structure shiftable between the effective position and the passive position, while the structures of the respective other engagement pairing are arranged rigidly on their respective coupling components.

5. The wheel spoiler arrangement according to claim 4, wherein the structure shiftable between the effective position and the passive position is a structure of the inactive engagement pairing.

6. The wheel spoiler arrangement according to claim 5, wherein the structure shiftable between the effective position and the passive position is the inactive configuration of the first coupling component.

7. The wheel spoiler arrangement according to claim 1, wherein the motion guidance system encompasses a four-joint linkage.

8. The wheel spoiler arrangement according to claim 7, wherein a plurality of joints are ball joints.

9. A motor vehicle having a wheel spoiler arrangement according to claim 1, the wheel spoiler carrier being arranged in vehicle-body-mounted fashion.

10. The wheel spoiler arrangement according to claim 1, wherein the overload coupling comprises a biasing device that biases the two coupling components in the direction of establishing the force-transferring engagement of the structures of an engagement pairing.

11. A wheel spoiler arrangement, encompassing: a wheel spoiler carrier; a wheel spoiler received displaceably relative to the wheel spoiler carrier between an inactive position and an active position constituting operating positions; a motion guidance system which is arranged between the wheel spoiler carrier and the wheel spoiler and guides the displacement of the wheel spoiler between its operating positions; and a displacement drive system which is coupled motion-transferringly to the wheel spoiler and is embodied and arranged to drive the wheel spoiler relative to the wheel spoiler carrier to perform a displacement motion between its operating positions; there being arranged in a force transfer path between the displacement drive system and the wheel spoiler an overload coupling that transfers force in a direction from the wheel spoiler to the displacement drive system only up to a predetermined limit load; the overload coupling comprising a first coupling component permanently connected to the displacement drive system and a second coupling component permanently connected to the wheel spoiler; the first coupling component comprising an active configuration that forms, with a counterpart active configuration of the second coupling component, an active engagement pairing with which force is transferable from the displacement drive system to the wheel spoiler during a displacement of the wheel spoiler as intended from the inactive position into the active position; and the first coupling component comprising an inactive configuration that forms, with a counterpart inactive configuration of the second coupling component, an inactive engagement pairing with which force is transferable from the displacement drive system to the wheel spoiler during a displacement of the wheel spoiler as intended from the active position into the inactive position, wherein, in at least one engagement pairing from among the active engagement pairing and inactive engagement pairing, one structure from among a configuration and a counterpart configuration of the engagement pairing is shiftable on a component body of the coupling component comprising the structure, relative to the component body, between an effective position projecting farther out of the component body, into which position the structure is preloaded and in which a force-transferring engagement with the respective other structure of the respective other coupling component is possible, and a passive position retracted farther into the component body, in which position the force-transferring engagement is not possible; a shiftable structure being shiftable, by a respective other structure of the same engagement pairing, from the effective position into the passive position upon exceedance of a limit load resulting from a force acting on the wheel spoiler, accompanied by termination of the force-transferring engagement of the structures with one another, wherein the overload coupling is a torque-transferring rotational coupling rotatable around a coupling axis and wherein the overload coupling comprises at least one of a plurality of active engagement pairings and a plurality of inactive engagement pairings.

12. The wheel spoiler arrangement according to claim 11, wherein the plurality of active engagement pairings and the plurality of inactive engagement pairings are arranged alternatingly in a circumferential direction around the coupling axis.

13. The wheel spoiler arrangement according to claim 12, wherein the plurality of inactive engagement pairings each having a structure that is arranged on a radially inner coupling component and is shiftable between an effective and a passive position; two shiftable structures being diametrically opposite one another and being shiftable along a common shifting axis.

14. The wheel spoiler arrangement according to claim 13, wherein the shiftable structure comprises a guidance configuration that is in guiding engagement with a counterpart guidance configuration of the respective other shiftable structure in order to assist guidance of the shifting motion.

15. The wheel spoiler arrangement according to claim 13, wherein the two shiftable structures are preloaded into their effective positions by a common preload device, in particular a preload spring.

16. The wheel spoiler arrangement according to claim 12, wherein at a predefined radial distance from the coupling axis, and in a circumferential direction around the coupling axis, a circumferential distance between an abutment surface of an active configuration and an abutment surface of a closest shiftable counterpart configuration, when considering the inactive configuration in its effective position, is greater than an inside width between the shiftable inactive configuration and a further active configuration immediately following it in the circumferential direction.

17. The wheel spoiler arrangement according to claim 11, wherein the overload coupling comprises a biasing device that biases the two coupling components in the direction of establishing the force-transferring engagement of the structures of an engagement pairing.

18. A wheel spoiler arrangement, encompassing: a wheel spoiler carrier; a wheel spoiler received displaceably relative to the wheel spoiler carrier between an inactive position and an active position constituting operating positions; a motion guidance system which is arranged between the wheel spoiler carrier and the wheel spoiler and guides the displacement of the wheel spoiler between its operating positions; and a displacement drive system which is coupled motion-transferringly to the wheel spoiler and is embodied and arranged to drive the wheel spoiler relative to the wheel spoiler carrier to perform a displacement motion between its operating positions; there being arranged in a force transfer path between the displacement drive system and the wheel spoiler an overload coupling that transfers force in a direction from the wheel spoiler to the displacement drive system only up to a predetermined limit load; the overload coupling comprising a first coupling component permanently connected to the displacement drive system and a second coupling component permanently connected to the wheel spoiler; the first coupling component comprising an active configuration that forms, with a counterpart active configuration of the second coupling component, an active engagement pairing with which force is transferable from the displacement drive system to the wheel spoiler during a displacement of the wheel spoiler as intended from the inactive position into the active position; and the first coupling component comprising an inactive configuration that forms, with a counterpart inactive configuration of the second coupling component, an inactive engagement pairing with which force is transferable from the displacement drive system to the wheel spoiler during a displacement of the wheel spoiler as intended from the active position into the inactive position, wherein, in at least one engagement pairing from among the active engagement pairing and inactive engagement pairing, one structure from among a configuration and a counterpart configuration of the engagement pairing is shiftable on a component body of the coupling component comprising the structure, relative to the component body, between an effective position projecting farther out of the component body, into which position the structure is preloaded and in which a force-transferring engagement with the respective other structure of the respective other coupling component is possible, and a passive position retracted farther into the component body, in which position the force-transferring engagement is not possible; a shiftable structure being shiftable, by a respective other structure of the same engagement pairing, from the effective position into the passive position upon exceedance of a limit load resulting from a force acting on the wheel spoiler, accompanied by termination of the force-transferring engagement of the structures with one another, wherein the overload coupling is a torque-transferring rotational coupling rotatable around a coupling axis and wherein the counterpart active configuration and the counterpart inactive configuration that is closest in a circumferential direction are end-located flanks of a radial projection that extends radially toward the respective other coupling component and has a cam surface proceeding in the circumferential direction between the flanks; the cam surface being embodied to hold an inactive configuration, which has been shifted into the passive position, in the passive position during a relative motion between the first and the second coupling component.

19. A wheel spoiler arrangement, encompassing: a wheel spoiler carrier; a wheel spoiler received displaceably relative to the wheel spoiler carrier between an inactive position and an active position constituting operating positions; a motion guidance system which is arranged between the wheel spoiler carrier and the wheel spoiler and guides the displacement of the wheel spoiler between its operating positions; and a displacement drive system which is coupled motion-transferringly to the wheel spoiler and is embodied and arranged to drive the wheel spoiler relative to the wheel spoiler carrier to perform a displacement motion between its operating positions; there being arranged in a force transfer path between the displacement drive system and the wheel spoiler an overload coupling that transfers force in a direction from the wheel spoiler to the displacement drive system only up to a predetermined limit load; the overload coupling comprising a first coupling component permanently connected to the displacement drive system and a second coupling component permanently connected to the wheel spoiler; the first coupling component comprising an active configuration that forms, with a counterpart active configuration of the second coupling component, an active engagement pairing with which force is transferable from the displacement drive system to the wheel spoiler during a displacement of the wheel spoiler as intended from the inactive position into the active position; and the first coupling component comprising an inactive configuration that forms, with a counterpart inactive configuration of the second coupling component, an inactive engagement pairing with which force is transferable from the displacement drive system to the wheel spoiler during a displacement of the wheel spoiler as intended from the active position into the inactive position, wherein, in at least one engagement pairing from among the active engagement pairing and inactive engagement pairing, one structure from among a configuration and a counterpart configuration of the engagement pairing is shiftable on a component body of the coupling component comprising the structure, relative to the component body, between an effective position projecting farther out of the component body, into which position the structure is preloaded and in which a force-transferring engagement with the respective other structure of the respective other coupling component is possible, and a passive position retracted farther into the component body, in which position the force-transferring engagement is not possible; a shiftable structure being shiftable, by a respective other structure of the same engagement pairing, from the effective position into the passive position upon exceedance of a limit load resulting from a force acting on the wheel spoiler, accompanied by termination of the force-transferring engagement of the structures with one another, wherein the overload coupling is a torque-transferring rotational coupling rotatable around a coupling axis and wherein the displacement drive system encompasses a toggle linkage crank drive that, when the wheel spoiler is displaced as intended from its inactive position into the active position, is rotated beyond its active top dead center point with maximum extension of the toggle linkage crank drive.

* * * * *